(12) United States Patent
Marra et al.

(10) Patent No.: US 11,617,979 B2
(45) Date of Patent: Apr. 4, 2023

(54) DEVICE AND METHOD FOR DETERMINING THE POLLUTION STATUS OF A PARTICLE FILTER IN AN AIR-CLEANING DEVICE

(71) Applicant: KONINKLIJKE PHILIPS N.V., Eindhoven (NL)

(72) Inventors: Johannes Marra, Eindhoven (NL); Achim Gerhard Koerber, Eindhoven (NL); Cornelis Reinder Ronda, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 499 days.

(21) Appl. No.: 16/349,308

(22) PCT Filed: Nov. 23, 2017

(86) PCT No.: PCT/EP2017/080136
§ 371 (c)(1),
(2) Date: May 13, 2019

(87) PCT Pub. No.: WO2018/099789
PCT Pub. Date: Jun. 7, 2018

(65) Prior Publication Data
US 2020/0179858 A1 Jun. 11, 2020

(30) Foreign Application Priority Data
Nov. 30, 2016 (EP) ..................................... 16201456

(51) Int. Cl.
*B01D 46/00* (2022.01)
*B01D 46/46* (2006.01)

(52) U.S. Cl.
CPC ......... *B01D 46/0086* (2013.01); *B01D 46/46* (2013.01); *B01D 2201/54* (2013.01)

(58) Field of Classification Search
CPC ................ B01D 46/0086; B01D 46/46; B01D 2201/54
(Continued)

(56) References Cited

U.S. PATENT DOCUMENTS

| 5,205,156 A | 4/1993 | Asano |
| 6,368,386 B1 * | 4/2002 | Nelson ................... B01D 46/10 95/268 |
| 8,123,840 B2 | 2/2012 | Marra |

(Continued)

FOREIGN PATENT DOCUMENTS

| CN | 2285673 Y | 7/1998 |
| CN | 1408461 A | 4/2003 |

(Continued)

*Primary Examiner* — Robert A Hopkins
*Assistant Examiner* — Qianping He
(74) *Attorney, Agent, or Firm* — Schott, P.C.

(57) ABSTRACT

The present invention relates to a device and method for determining the pollution status of a particle filter (10) for an air-cleaning device (1) with increased accuracy at low extra costs. The device comprises a sheet resistance input (43) for obtaining sheet resistance information (21) indicating or allowing to determine an electrical sheet resistance of the particle filter (10); a humidity input (44) for obtaining humidity information (31) indicating the relative humidity of the filter's environment; and a processor (45) for comparing the electrical sheet resistance indicated by or determined from the obtained sheet resistance information (21) with a reference sheet resistance of a clean particle filter at the relative humidity (31) indicated by the obtained humidity information and given at the time of acquisition of said electrical sheet resistance and for generating, based on said comparison, a control signal (41) for control of the air-cleaning device and/or a status information (42) indicating the pollution status of the particle filter (10).

15 Claims, 2 Drawing Sheets

(58) Field of Classification Search
USPC .......................................................... 96/417
See application file for complete search history.

(56) References Cited

U.S. PATENT DOCUMENTS

| | | | |
|---|---|---|---|
| 8,685,140 B2 | 4/2014 | Yacoub | |
| 8,974,585 B2 | 3/2015 | Hartmann | |
| 2002/0059912 A1 | 5/2002 | Bauer | |
| 2003/0056646 A1 | 3/2003 | Tanaka | |
| 2008/0048681 A1 | 2/2008 | Birkhofer | |
| 2009/0211455 A1 | 8/2009 | Guenther | |
| 2015/0273376 A1* | 10/2015 | Sohn | B01D 46/0002 96/74 |
| 2016/0243486 A1* | 8/2016 | Galsim | B01D 46/0078 96/417 |
| 2018/0245499 A1* | 8/2018 | Cremeens | G01N 1/2252 |
| 2019/0262750 A1* | 8/2019 | Key | B01D 46/448 |

FOREIGN PATENT DOCUMENTS

| | | | | |
|---|---|---|---|---|
| CN | 101801495 A | | 8/2010 | |
| CN | 103322623 A | * | 9/2013 | |
| CN | 103322623 A | | 9/2013 | |
| CN | 104822999 A | | 8/2015 | |
| CN | 106016555 A | | 10/2016 | |
| CN | 106016555 A | * | 10/2016 | |
| EP | 2303619 | | 4/2011 | |
| JP | 2009022882 A | | 2/2009 | |
| JP | 2010125414 | | 6/2010 | |
| JP | 2011252459 | | 12/2011 | |
| WO | 200220668 A2 | | 3/2002 | |
| WO | 2009/033143 | | 3/2009 | |
| WO | 2015/042960 | | 4/2015 | |
| WO | WO-2015042960 A1 | * | 4/2015 | ............. F24F 11/30 |
| WO | 2016/181210 | | 11/2016 | |

* cited by examiner

DEVICE AND METHOD FOR DETERMINING THE POLLUTION STATUS OF A PARTICLE FILTER IN AN AIR-CLEANING DEVICE

CROSS REFERENCE TO RELATED APPLICATIONS

This application is the U.S. National Phase application under 35 U.S.C. § 371 of International Application No. PCT/EP2017/080136 filed Nov. 23, 2017 published as WO 2018/099789 on Jun. 7, 2018, which claims the benefit of European Patent Application Number 16201456.7 filed Nov. 30, 2016. These applications are hereby incorporated by reference herein.

FIELD OF THE INVENTION

The present invention relates to a device and a method for determining the pollution status of a particle filter in an air-cleaning device. Further, the present invention relates to an air-cleaning device.

BACKGROUND OF THE INVENTION

Apart from ventilation with outdoor air, portable indoor air cleaners are increasingly used to at least partly purify the indoor air from polluting particles and (odorous) gases. Air cleaners are popular with people living in mega-cities where the outdoor air can be severely polluted. A high outdoor air pollution level makes the outdoor air less suitable for indoor air cleaning through ventilation.

One of the air cleaner tasks is the effective removal of particles, gases (VOCs, ozone, $NO_2$) and odors from air that result from indoor smoking. Smoking is a particularly severe source of indoor air pollution. An air cleaner is typically equipped with a pleated fibrous particle filter for capturing (smoke) particles from air, and an activated carbon (AC) filter for adsorbing VOCs and their associated odors from air. To protect the AC filter from contamination with deposited particles, it is common practice to position the AC filter downstream from the particle filter. This also enables the AC filter to immediately capture the gases and odors that may be released from the particle filter through VOC release from captured smoke tar particles. Achieving a satisfactory filtration efficiency towards airborne smoke particles is no problem for a well-designed fibrous filter. However, due to cost and space constraints, the same efficiency level is generally not achieved by the AC filter towards gases and odors. When the upstream particle filter becomes gradually loaded with smoke tar, it may become a serious source of odor pollution, which cannot sufficiently be dealt with by the downstream AC filter.

In ventilation units and industrial filtration units, the end of the particle filter lifetime is usually detected by monitoring the increase in the incurred pressure drop across the filter due to accumulated dust. In contrast, the end of the particle filter lifetime in indoor air cleaners is more often related to odor emission than to a pressure drop increase, particularly when the filtration of particles derived from cooking and/or combustion (frying, smoking, incense burning, etc.) is concerned.

JP 2010-125414 A1 discloses an air filtering apparatus that detects a proper time for exchanging an air filter before the rate of air passing through the air filter becomes seriously decreased due to clogging. The air filtering apparatus includes the air filter for filtering gases installed in a gas passage, a first magnet of which the S-pole side is inserted in the air filter, a second magnet of which the N-pole side is inserted in the air filter at a position located at a predetermined distance from the first magnet, an electrical resistance value detecting means for detecting a resistance value between the first magnet and the second magnet and a clogging determining means for determining that the air filter is clogged when the resistance value between both magnets drops below a predetermined value. The presence of magnets is relevant and advantageous for the timely determination of filter clogging when the filtered particles comprise iron particles. However, this is only encountered in industrial settings and is not applicable for determining the lifetime of particle filters in indoor air cleaners where smell emission from filtered particles is more important than filter clogging.

WO 2016/181210 A2 discloses an intelligent filter construction for household appliances, in particular for drying/washing-drying machines, for separating solid particles from liquid or gaseous fluids, comprising a synthetic monofilament precision fabric material, of a weft and warp type, with which is integrally associated a capacitive sensor adapted to measure in real time values of a moisture in an air flow passing through the fabric material thereby optimizing the household appliance operating cycle.

WO 2015/042960 A1 discloses methods and systems for detecting the accumulation of dust in a filter of a HVAC system. In one example, there is provided a capacitive sensor system. The capacitive sensor system comprises a first conductive mesh, a second conductive mesh, a first filter media disposed between the first conductive mesh and the second conductive mesh, and a circuit configured to measure a capacitance of a first capacitive sensor formed by the first conductive mesh, second conductive mesh, and the first filter media.

US 2002/059912 A1 discloses an intake system for an internal combustion engine of a motor vehicle, which includes a first air intake, which is arranged at a point in the motor vehicle that is advantageous for air intake, and a second air intake, which is arranged at a point that is protected from road spray and splashes of water. The two air intakes end in a common line that communicates with the internal combustion engine. In the first air intake, a moisture sensor is arranged. When water enters into the first air intake, this moisture sensor emits a signal that actuates a solenoid to move a pivotable valve. In a first switching position pivotable valve closes the second air intake so that no air reaches line from the second air intake. In a second position (shown in broken lines) pivotable valve closes the first air intake so that air reaches line only through the second air intake.

SUMMARY OF THE INVENTION

It is an object of the present invention to provide an improved device and method for determining the pollution status of a particle filter for an air-cleaning device with increased accuracy at low extra costs.

It is a further object of the present invention to provide a corresponding air-cleaning device.

In a first aspect of the present invention a device for determining the pollution status of a particle filter for an air-cleaning device is presented comprising:
 a sheet resistance input configured to obtain sheet resistance information indicating or allowing to determine an electrical sheet resistance of the particle filter;

a humidity input configured to obtain humidity information indicating the relative humidity of the filter's environment; and a processor configured to compare the electrical sheet resistance indicated by or determined from the obtained sheet resistance information with a reference sheet resistance of a clean particle filter at the relative humidity indicated by the obtained humidity information and given at the time of acquisition of said electrical sheet resistance and to generate, based on said comparison, a control signal for control of the air-cleaning device and/or a status information indicating the pollution status of the particle filter.

In a further aspect of the present invention an air-cleaning device is presented comprising:

a particle filter;

a sheet resistance measurement unit configured to measure an electrical sheet resistance of the particle filter and to generate sheet resistance information indicating or allowing to determine the measured electrical sheet resistance;

a humidity measurement unit configured to measure the relative humidity of the filter's environment and to generate humidity information indicating the measured relative humidity; and a device as disclosed herein for determining the pollution status of the particle filter based on the generated sheet resistance information and the generated humidity information.

In yet further aspects of the present invention, there are provided a corresponding method, a computer program which comprises program code means for causing a computer to perform the steps of the method disclosed herein when said computer program is carried out on a computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed devices, method, computer program and medium have similar and/or identical preferred embodiments as the claimed system, in particular as defined in the dependent claims and as disclosed herein.

The present invention is based on the idea to obtain information, such as a status indicator, for a particle filter that relies on measurements of the filter's sheet resistance in the course of time. Via sheet resistance measurements relative to the sheet resistance value of a clean filter, the amount and age of the smoke tar in the filter can be monitored. The deposition of relatively hydrophilic smoke tar in the filter, e.g. in a filter composed of hydrophobic fibrous material, induces a smoke-related drop of the filter's sheet resistance level. With the help of suitable calibration data on the odor perception as a function of the amount and age of the deposited smoke tar, knowledge of the sheet resistance allows the lifetime of the particle filter to be determined, within which the odor emission level from the filter remains acceptable.

In addition, knowledge of the filter status allows the filter lifetime to be extended, e.g. by controlling the airflow rate through the filter. A reduced airflow rate reduces the volatile organic compound (VOC) emission rate from the deposited smoke tar and increases the efficiency of the filter to remove the emitted VOCs/odors from air. The VOC release rate from filtered smoke particles gradually diminishes when the smoke tar ages.

This also allows a mode, e.g. during the night or when no persons are in the room of the air-cleaning device, in which the air-cleaning device is operated with reduced air flow, to desorb VOCs from the particle filter that are subsequently absorbed by activated carbon. This mode can also be chosen automatically, only when needed, based on the sheet resistance change detected.

Hence, according to the present invention knowledge of the presence of limited amounts of smoke tar in the filter can be provided, e.g. by way of a filter status indicator. Knowledge of the filter status concerning its loading level with (aged) smoke tar can be used for feedback purposes, for extending the particle filter lifetime, and for signaling the end of filter lifetime when the filter's odor emission becomes unacceptable.

This information can in addition be used in e.g. service models in professional solutions, where it is important to estimate the remaining operational lifetime of the filter (before it produces an unacceptable smell). This allows optimized maintenance schemes. Moreover, the present invention allows optimization of purifier operation in terms of discomfort by direct smoke and smell development. When there is being smoked, the air purifier can be operated while also developing smell, and when there is not being smoked, a different mode of operation can be chosen, preventing or reducing smell development.

According to a preferred embodiment said processor is configured to generate a comparison value by said comparison and to generate status information and/or a control signal only if said comparison value exceeds a predetermined pollution threshold. Hence, if the pollution threshold is not exceeded no action may be taken. The threshold may be acquired in advance, e.g. through tests or simulation, and set in the device, e.g. by the manufacturer or by the consumer, e.g. app based. In this way, the device can be personalized.

In another embodiment said processor is configured to generate said comparison value by forming a ratio or difference between said electrical sheet resistance indicated by or determined from the obtained sheet resistance information with said reference sheet resistance. This provides a simple but effective way of determining the comparison value and if the pollution threshold is exceeded.

Said processor may further be configured to use a predetermined pollution threshold based on said relative humidity indicated by the obtained humidity information and given at the time of acquisition said electrical sheet resistance. Thus, there are various thresholds available for different relative humidities, and based on the actually given humidity the corresponding threshold is selected as reference. This further improves the accuracy of the determination of the pollution status.

Said processor may further be configured to generate different status information and/or a different control signal, depending on the degree by which said comparison value exceeds the predetermined pollution threshold. This degree may thus control the content of the status information, e.g. the warning level of a warning or the kind of action recommended to the user, and/or kind of control performed in response to the control signal.

In another embodiment said processor is configured to generate a control signal for controlling a fan for generating an airflow through the particle filter depending on the degree, by which said comparison value exceeds the predetermined pollution threshold, in particular for controlling the fan to increasingly reduce the airflow if the predetermined pollution threshold is increasingly exceeded or to reduce the airflow if the predetermined pollution threshold is exceeded. This reduces the distribution of undesired odors with increasing degree of pollution of the filter.

In still another embodiment said processor is configured to generate status information indicating one or more of an estimated lifetime of the particle filter, an estimated degree of pollution of the particle filter, and a recommendation related to the use and/or the replacement of the particle filter. Thus, the user or manufacturer may set the kind of information. Further, all or some pieces of such information may be generated and issued or offered for being issued, e.g. through a user menu.

The disclosed air-cleaning device comprises a particle filter, a sheet resistance measurement unit for measuring an electrical sheet resistance of the particle filter and for generating sheet resistance information indicating or allowing to determine the measured electrical sheet resistance, a humidity measurement unit for measuring the relative humidity of the filter's environment and for generating humidity information indicating the measured relative humidity and a device as described above for determining the pollution status of the particle filter based on the generated sheet resistance information and the generated humidity information. Such an air-cleaning device may be a stationary or a mobile device.

In an embodiment the air-cleaning device may further comprise an electrode structure arranged on a surface of the particle filter or an additional filter patch arranged on a surface of the particle filter facing an incoming airflow. This enables a good measurement of the electrical sheet resistance of the particle filter at low costs. Hereby, the electrode structure may comprise two interdigitated electrodes, which allows accurate measurements.

Further, in an embodiment said sheet resistance measurement unit may comprise a voltage source for applying a voltage to a first electrode and a voltage measurement unit for measuring a voltage across a load resistance connected to the second electrode, wherein the processor is configured to determine the sheet resistance information from the applied voltage, the measured voltage, the load resistance, and dimensional parameters of the two interdigitated electrodes. This enables a simple and cost-effective way of measuring the electrical sheet resistance.

While generally various types of particle filter may be used, in a preferred embodiment said particle filter comprises hydrophobic fibrous filter material.

The air cleaning device may further comprise a fan for generating an airflow through the particle filter, wherein the processor of said device is configured to generate a control signal for controlling said fan. In this way the airflow through the filter can be dynamically controlled depending on the pollution state of the filter.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
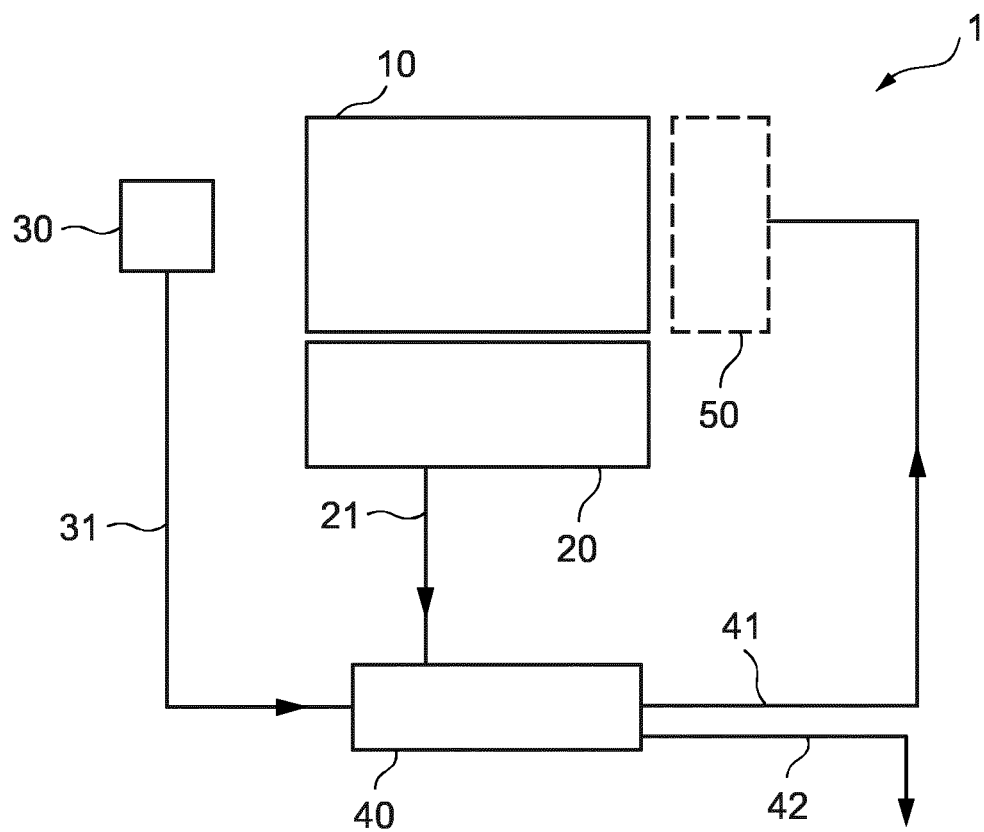
FIG. 1 shows a schematic diagram of an embodiment of an air-cleaning device according to the present invention.

FIG. 1 shows a schematic diagram of an embodiment of an air-cleaning device 1 according to the present invention. It comprises a particle filter 10, a sheet resistance measurement unit 20, a humidity measurement unit 30 and a device 40 for determining the pollution status of the particle filter 10 based on the generated sheet resistance information and the generated humidity information. Optionally, the air-cleaning device further comprises a fan 50 for generating an airflow through the particle filter 10.

The particle filter 10 may be a fibrous particle filter and may be made of a hydrophobic fibrous filter material. The sheet resistance measurement unit 20 is configured to measure an electrical sheet resistance (which generally is a measure of resistance of thin films that are nominally uniform in thickness) of the particle filter 10 and to generate sheet resistance information 21 indicating or allowing to determine the measured electrical sheet resistance. Sheet resistance and its measurement are generally known in the art, sheet resistance being a measure of resistance of thin films that are nominally uniform in thickness. The humidity measurement unit 30 is configured to measure the relative humidity of the filter's environment, e.g. its immediate environment representing the area around or adjacent to the filter (e.g. at a certain maximum distance, such as less than 100 cm, preferably less than 50 cm, more preferably less than 25 cm), and to generate humidity information 31 indicating the measured relative humidity.

Figure 2:
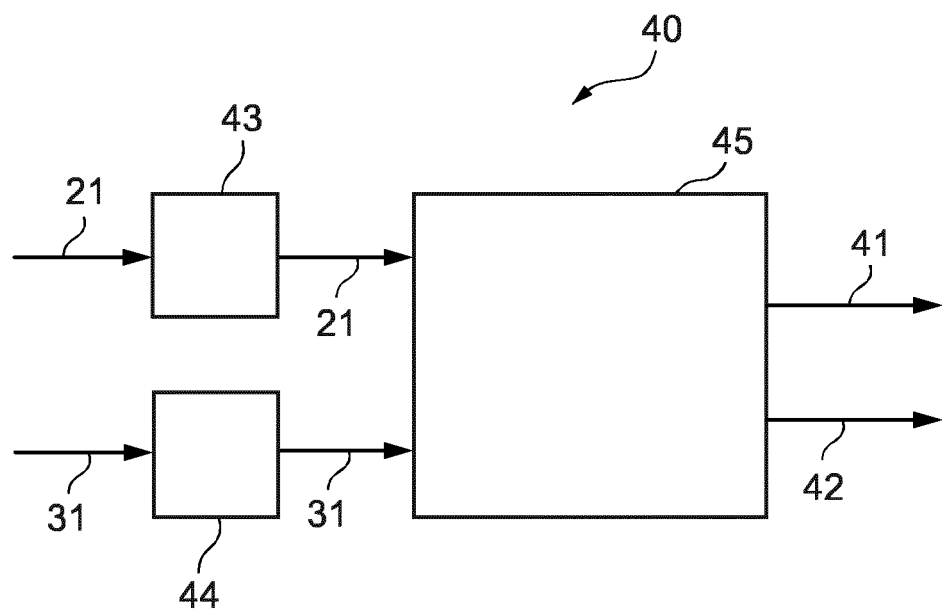
FIG. 2 shows a schematic diagram of an embodiment of a device for determining the pollution status of a particle filter according to the present invention.

The device 40 is particularly configured to generate a control signal 41 for control of the air-cleaning device 1, e.g. of the optional fan 50 of the air-cleaning device 1, and/or a status information 42 indicating the pollution status of the particle filter 10. An embodiment of the device 40 is depicted in FIG. 2. It comprises a sheet resistance input 43 for obtaining (i.e. receiving or retrieving) the sheet resistance information 21, humidity input 44 for obtaining (i.e. receiving or retrieving) the humidity information 31 and a processor 45. The processor 45 is configured to compare the electrical sheet resistance indicated by or determined from the obtained sheet resistance information 21 with a reference sheet resistance 22 of a clean particle filter at the relative humidity indicated by the obtained humidity information 31 and given at the time of acquisition of said electrical sheet resistance and to generate, based on said comparison, a control signal 41 for control of the air-cleaning device and/or a status information 42 indicating the pollution status of the particle filter, which status information 42 may e.g. display or otherwise be issued for reception by a user.

The device 40 may be implemented in hard- and/or software, e.g. as a correspondingly programmed microprocessor or computer.

Figure 3:
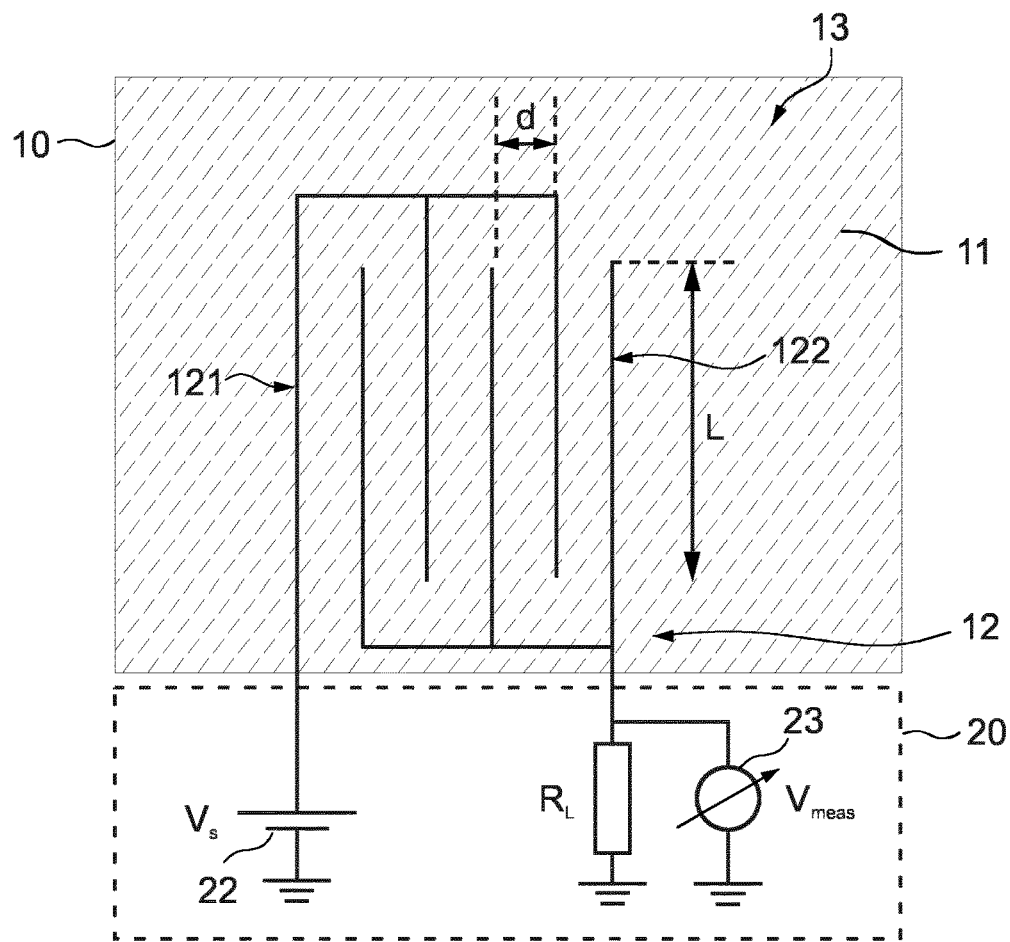
FIG. 3 shows a top view of an embodiment of a particle filter and an embodiment of a sheet resistance measurement unit according to the present invention.

FIG. 3 shows a top view of an embodiment of a particle filter 10 and an embodiment of a sheet resistance measurement unit 20 according to the present invention. The particle filter 10 comprises a filter material 11, e.g. hydrophobic fibrous filter material, for capturing particles, in particular smoke particles and cooking aerosols, from air passing through the filter material 11. Further, an electrode structure 12 is arranged on a surface 13 of the particle filter 10 or an additional filter patch (not shown), e.g. a separate hydrophobic fibrous filter patch, arranged on the surface 13 of the particle filter 11 facing an incoming airflow.

The electrode structure 12 of this embodiment comprises two sets 121, 122 of interdigitated electrodes. The electrode sets 121, 122 only need to cover (a small) part of the filter surface 13. The sheet resistance measurement unit 20 comprises a voltage source 22 to provide a (DC) voltage $V_s$ to one electrode set 121. The resulting electrical current $I_s$ between the electrode sets 121, 122 follows from a measurement, by a measurement unit 23, of the voltage $V_{meas}$ across a load resistance $R_L$ that connects the second electrode set 122 to ground potential. Here, $V_{meas}=I_s \times R_L$. The sheet resistance $R_R$ of the filter 10 (or of an additional filter patch carrying the electrode structure in an embodiment) is obtained from the measured voltage $V_{meas}$ according to $$R_R=(2N-1)\times V_s \times R_L \times L/(V_{meas} \times d) \text{ with } N>0.$$

Hereby, N is the number of electrode branches in an electrode set (N=3 in this exemplary embodiment), L is the length of an electrode branch, and d is the space between adjacent electrodes. In an embodiment the field strength between adjacent electrodes $E_s=V_s/d$ is preferably kept at $E_s \leq 0.1$ kV/mm to avoid corona discharges. The measuring sensitivity with respect to $V_{meas}$ can be increased by increasing $R_L$, L and/or N.

The sheet resistance $R_R$ of the filter 10 can be computed from the different parameters, as mentioned above, by the processor 45 of the device 40 or by a separate computation unit provided within or separate from the sheet measurement unit 20.

Figure 4:
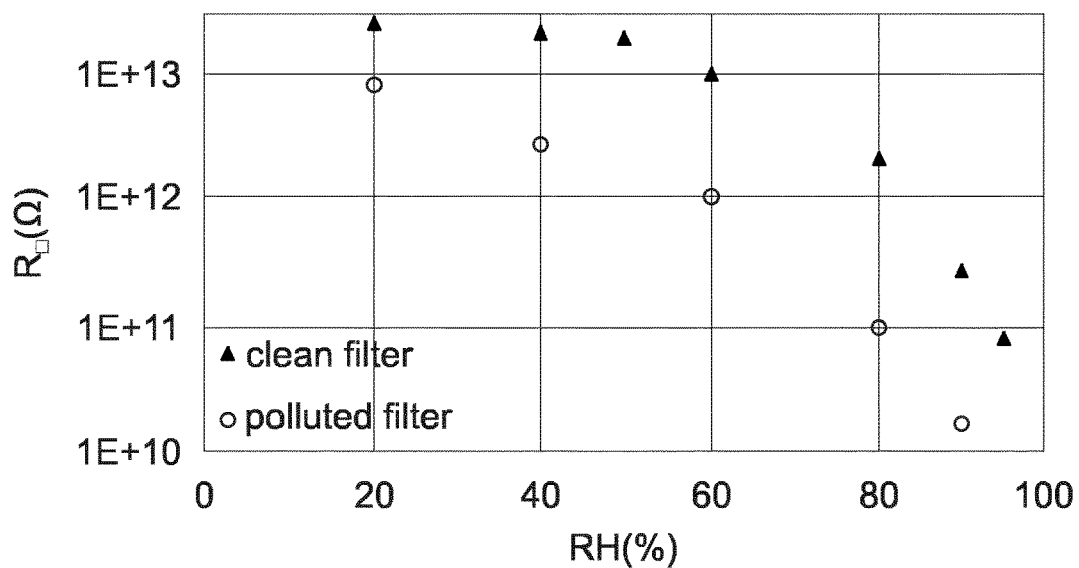
FIG. 4 shows a diagram of measured values of electrical sheet resistance over humidity for a clean and a polluted filter.

Using the set-up shown in FIG. 3, measured values of electrical sheet resistance at different relative humidities (RH) for a clean filter ($R_{R,cl}(RH)$) and a polluted filter ($R_R(RH)$) have been obtained as depicted in the diagram shown in FIG. 4. The polluted filter is the same filter or a filter of the same kind as used for measurement of the electrical sheet resistance after its loading with certain amount of cigarette smoke. The values $R_{R,cl}(RH)$ and $R_R(RH)$ decrease with increasing humidity RH due to increasing moisture adsorption by the smoke tar at higher RH levels, which reduces the sheet resistance. It is noted that a truly hydrophobic clean filter should exhibit a $R_{R,cl}(RH)$ profile that hardly depends on the RH up to RH=95%. This will amplify the change in $R_R(RH)$ due to the hydration of smoke tar only.

In FIG. 4, the deposition of the smoke of 400 cigarettes in a full-sized filter possessing 1 m² filtration area reduces $R_R(RH)$ by about an order of magnitude across the RH range from RH=40% and up. At RH≤40%, $R_R(RH)$ becomes relatively less dependent on the amount of smoke in the filter. After flushing the smoke-laden filter with clean air for at least several hours, $R_R(RH)$ is observed to slowly increase due to VOC release from the deposited smoke tar. The $R_R(RH)$ increase occurs in parallel with a gradual decrease in the odor emission from the filter Based on the above data and observations, an exemplary metric f(RH, t) for assessing the filter status can be defined as $$f(RH,t)=1-R_R(RH,t)/R_{R,cl}(RH).$$

For a clean filter, f(RH, t)=0. The factor f(RH, t) increases with increasing amounts of smoke tar in the filter but decreases again when the filter is flushed with clean air for extended periods of time. From odor perception experiments on smoke-exposed filters, a maximum value $f_{max}(RH)$ can be established at which the end of filter lifetime has been reached. Odor emission from the filter is then judged as unacceptable and the filter should be replaced. Further, a maximum air filtration time $t_{max}$ can be estimated after which the filter is deemed to have been used to such an extent that its replacement is recommended anyway, irrespective of the smoke tar accumulation in the filter, e.g. when the particle removal Clean Air Delivery Rate (CADR) is two times smaller than the CADR of a new filter.

Information about the measured RH and f(RH, t) is received as input by the device 40, which may be part of or configured as air cleaner controller. In response, the device 40 can issue filter status messages and/or adjust the airflow rate through the filter according to the scheme explained above. When the particle filter 10 emits a limited amount of odor, a flow rate reduction enhances the odor removal efficiency of the AC filter located downstream from the particle filter, which will diminish the odor emission from the air cleaner to almost zero.

In an embodiment, an algorithm may be used, with which the device 40 controls the airflow through the filter 10 and/or issues status messages. Firstly, the algorithm relies on input about measured values of RH and $R_R(RH, t)$. Secondly, it relies on data from independent calibration experiments such as $R_{R,cl}(RH)$, $t_{max}$, $f_{max}(RH)$ and the perceived odor intensity as a function of f(RH,t). A mild odor emission is associated with the values f(RH, t)≤χ(RH)$f_{max}$(RH), while a moderate odor emission associates with f(RH, t)≤χ(RH)$f_{max}$(RH) with χ(RH) a pre-established fractional number. As long as 0≤f(RH, t)≤$f_{min}$(RH) the filter is considered as a (almost) clean filter. Values for $f_{min}$(RH) at different RH levels can be determined from independent calibration experiments. Generally, $f_{min}$(RH)<χ(RH)$f_{max}$(RH).

An exemplary algorithm may read as follows:

If f(RH,t)≤$f_{min}$(RH)
   status message: "clean filter"
   airflow rate: no restrictions;
if $f_{min}$(RH)≤f(RH,t)≤χ(RH)$f_{max}$(RH) and t<$t_{max}$
   status message: "slightly polluted filter"
   airflow rate: no restrictions;
if $f_{min}$(RH)≤f(RH,t)≤χ(RH)$f_{max}$(RH) and t≥$t_{max}$
   status message: "filter replacement recommended"
   airflow rate: no restrictions;
if χ(RH)$f_{max}$(RH)≤f(RH,t)≤$f_{max}$(RH) and t<$t_{max}$
   status message: "moderately polluted filter"
   airflow rate: moderate airflow rate reduction from the maximum airflow rate;
if χ(RH)$f_{max}$(RH)≤f(RH,t)≤$f_{max}$(RH) and t≥$t_{max}$
   status message: "filter replacement recommended"
   airflow rate: significant airflow rate reduction from the maximum airflow rate;
if f(RH,t)>$f_{max}$(RH)
   status message: "filter replacement recommended"
   airflow rate: significant airflow rate reduction from the maximum airflow rate.

Thus, in an embodiment the control signal for controlling the fan for generating an airflow through the particle filter and/or status information is generated depending on the degree, by which a comparison value exceeds the predetermined pollution threshold. The comparison value hereby results from a comparison of the electrical sheet resistance indicated by or determined from the obtained sheet resistance information 21 with a reference sheet resistance of a clean particle filter at the relative humidity 31 indicated by the obtained humidity information and given at the time of acquisition of said electrical sheet resistance. For instance, the control signal may be generated such that the fan is increasingly reducing the airflow if a predetermined pollution threshold is increasingly exceeded with increasing degree. Alternatively, the airflow may simply be reduced, e.g. stepwise or in a single step, if the predetermined pollution threshold is exceeded.

Generally, such a comparison value, which may be the above described function, may be used to generate status information and/or a control signal only if said comparison value exceeds a predetermined pollution threshold, which may be set by the manufacturer for each model of the particle filter or air-cleaning device. Hereby, the comparison value by forming a ratio or difference between said electrical sheet resistances indicated by or determined from the obtained sheet resistance information with said reference sheet resistance.

There may also be a table of a number of predetermined pollution thresholds for different relative humidity values, and the correct pollution threshold may be determined from the table based on the actually given humidity value. Instead of a table, a formula or function may be defined for setting the pollution threshold based on the actually given humidity value.

With the present invention a balance between the demands of a high filtration efficiency, a minimized odor emission from the filter, and a maximized filter lifetime can be achieved. This information can in addition be used in e.g. service models in professional solutions, where it is important to estimate the remaining life time of the filter (before it produces an unacceptable smell), and allowing optimized maintenance schemes.

Moreover, the present invention allows optimization of purifier operation in terms of discomfort by direct smoke and smell development. When smoking occurs, the air purifier can be operated while also developing smell (the discomfort of direct smoke is much larger). When no smoking occurs, a different mode of operation can be chosen, preventing or reducing smell development from outgassing smoke tar in the particle filter.

The invention can be applied in all cases in which smell is being developed by the filter itself, due to absorption of pollutants from air, i.e. also for air pollutants originating from incense burning, cooking or (deep-)frying.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A device for determining a pollution status of a particle filter in an air-cleaning device, said device comprising:
a sheet resistance measurement unit configured to obtain sheet resistance information indicating or allowing to determine an electrical sheet resistance of the particle filter;
a humidity input configured to obtain humidity information indicating relative humidity of an environment of the particle filter; and
a processor configured to:
compare the electrical sheet resistance indicated by or determined from the obtained sheet resistance information with a reference sheet resistance of a clean particle filter at the relative humidity indicated by the obtained humidity information and given at the time of acquisition of said electrical sheet resistance, and to generate, based on a determination whether a comparison value generated from said comparison exceeds at least one of: a predetermined minimum pollution threshold and a predetermined maximum pollution threshold, a control signal for controlling an airflow rate through the particle filter of the air-cleaning device and status information indicating the pollution status of the particle filter.

2. The device as claimed in claim 1, wherein said processor is configured to generate the status information and the control signal only if said comparison value exceeds at least one of: the predetermined minimum pollution threshold and the predetermined maximum pollution threshold.

3. The device as claimed in claim 2, wherein said processor is configured to generate said comparison value by forming a ratio or difference between said electrical sheet resistance indicated by or determined from the obtained sheet resistance information with said reference sheet resistance.

4. The device as claimed in claim 2, wherein said processor is configured to use at least one of: said predetermined minimum pollution threshold and said predetermined maximum pollution threshold based on said relative humidity indicated by the obtained humidity information and given at the time of acquisition of said electrical sheet resistance.

5. The device as claimed in claim 2, wherein said processor is configured to generate different status information and a different control signal, depending on a degree by which said comparison value exceeds at least one of: the predetermined minimum pollution threshold and the predetermined maximum pollution threshold.

6. The device as claimed in claim 2, wherein said processor is configured to generate a control signal for controlling a fan for generating the airflow through the particle filter depending on a degree, by which said comparison value exceeds at least one of: the predetermined minimum pollution threshold and the predetermined maximum pollution threshold, for controlling the fan to increasingly reduce the airflow if the predetermined pollution threshold is increasingly exceeded or to reduce the airflow if the predetermined pollution threshold is exceeded.

7. The device as claimed in claim 1, wherein said processor is configured to generate the status information indicating one or more of: an estimated lifetime of the particle filter, an estimated degree of pollution of the particle filter, and a recommendation related to use and/or replacement of the particle filter.

8. The device as claimed in claim 1, further comprising a table of a number of predetermined pollution thresholds for different values of relative humidity.

9. The device as claimed in claim 8, wherein a predetermined pollution threshold is determined from the table based on an actual given humidity value.

10. The device as claimed in claim 1, wherein at least one of: the predetermined minimum pollution threshold, the predetermined maximum pollution threshold, and a predetermined maximum air filtration time of the particle filter are determined based on calibration experiments performed on the particle filter, and wherein the generation of the control signal is further based on the predetermined maximum air filtration time of the particle filter.

11. An air-cleaning device comprising:
a particle filter;
a sheet resistance measurement unit configured to measure an electrical sheet resistance of the particle filter, and generate sheet resistance information indicating or allowing to determine the measured electrical sheet resistance;
a humidity measurement unit configured to measure relative humidity of an environment of the particle filter, and generate humidity information indicating the measured relative humidity; and
a device configured to compare the measured electrical sheet resistance with a reference sheet resistance of a clean particle filter at the measured relative humidity and given at the time of acquisition of said electrical sheet resistance, and to determine a control signal for controlling an airflow rate through the particle filter of the air-cleaning device and a pollution status of the particle filter based on whether a comparison value generated from said comparison exceeds at least one of: a predetermined minimum pollution threshold and a predetermined maximum pollution threshold.

12. The air-cleaning device as claimed in claim 11, further comprising an electrode structure arranged on a surface of the particle filter, or an additional filter patch arranged on a surface of the particle filter facing an incoming airflow, wherein the electrode structure comprises two interdigitated electrodes.

13. The air-cleaning device as claimed in claim 12, wherein said sheet resistance measurement unit comprises a voltage source for applying a voltage to a first electrode, and a voltage measurement unit for measuring a voltage across a load resistance connected to a second electrode, and wherein a processor is configured to determine the sheet resistance information from the applied voltage, the measured voltage, the load resistance, and dimensional parameters of the two interdigitated electrodes.

14. The air-cleaning device as claimed in claim 11, wherein said particle filter comprises hydrophobic fibrous filter material.

15. The air-cleaning device as claimed in claim 11, further comprising a fan to generate the airflow through the particle filter, wherein a processor of said device is configured to generate the control signal for controlling the airflow rate of said fan.

* * * * *